(12) United States Patent
Karaoguz

(10) Patent No.: US 7,418,267 B2
(45) Date of Patent: *Aug. 26, 2008

(54) LOCATION-BASED TRANSACTION AUTHENTICATION OF WIRELESS TERMINAL

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/731,237

(22) Filed: Mar. 29, 2007

(65) Prior Publication Data

US 2007/0184817 A1 Aug. 9, 2007

Related U.S. Application Data

(63) Continuation of application No. 10/993,080, filed on Nov. 19, 2004, now Pat. No. 7,212,806, which is a continuation-in-part of application No. 10/314,279, filed on Dec. 9, 2002.

(60) Provisional application No. 60/409,955, filed on Sep. 12, 2002.

(51) Int. Cl.
*H04Q 7/20* (2006.01)

(52) U.S. Cl. .................... 455/456.1; 455/410; 455/411; 455/412.2; 455/456.3

(58) Field of Classification Search ................ None
See application file for complete search history.

(56) References Cited

U.S. PATENT DOCUMENTS 7,212,806 B2 * 5/2007 Karaoguz ................... 455/411

* cited by examiner

*Primary Examiner*—Duc Nguyen
*Assistant Examiner*—Dai A Phuong
(74) *Attorney, Agent, or Firm*—Garlick Harrison & Markison; Bruce E. Garlick

(57) ABSTRACT

A wireless terminal implements location-based transaction authentication and includes a wireless interface, a user interface, a Global Positioning System (GPS) receiver, and a processing unit. The wireless terminal receives a transaction request from the user, accesses a servicing network via the wireless interface, sends a transaction initiation request to the servicing network, receives an authentication challenge from the servicing network, and determines its current location via access of the GPS receiver. The wireless terminal prepares and transmits an authentication response based upon the received location. When the authentication response is accepted by the servicing network, the processing unit is able to service the transaction between the user and the servicing network. When the authentication response is rejected the transaction is not serviced. Relative location information and further user authentication may also be used.

40 Claims, 5 Drawing Sheets

LOCATION-BASED TRANSACTION AUTHENTICATION OF WIRELESS TERMINAL

CROSS REFERENCE TO RELATED APPLICATIONS

This application is a continuation of U.S. Utility Application No. 10/993,080, filed Nov. 19, 2004, now U.S. Pat. No. 7,212,806 which is a continuation-in-part of U.S. Utility Application No. 10/314,279 filed Dec. 9, 2002, copending, which claims priority to U.S. Provisional Patent Application Ser. No. 60/409,955, entitled Using Signal-Generated Location Information to Identify and Authenticate Available Devices, filed Sep. 12, 2002., all of which are incorporated herein by reference for all purposes.

FIELD OF THE INVENTION

The present invention relates generally to wireless communications; and more particularly to the operation of a wireless terminal.

BACKGROUND OF THE INVENTION

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), Wireless Personal Area Networks (WPANs), and other networks that employ a wireless link between a serviced terminal and a network infrastructure. Of course, many communications are serviced using a combination of wireless communication systems and wired communication systems.

Wireless communication systems support mobility of a serviced wireless terminal. In cellular wireless communication systems, a cellular telephone may roam across wide areas and still receive service. In the United States, many service providers support nationwide roaming of cellular telephones. Such is also the case in Europe and other countries across the globe. WLANs support wireless terminals within a WLAN service area. WLAN service areas are typically established, using Wireless Access Points (WAPs) and a backbone network, to service a premises such as an office complex, a coffee shop, an airport lounge, a home, etc. Wireless terminals may roam from WLAN service area to WLAN service area. WPANs typically service communications between wireless devices at a maximum distance of 10 feet. WPAN wireless terminals typically have the ability to establish WPAN communications with any proximate servicing host/peer device.

Many security issues exist with regard to wireless terminals. Wireless transmissions between a wireless terminal and its servicing base station, WAP, or host device/peer device propagate wirelessly. Other terminals in the vicinity can easily intercept these transmissions without permission, listen to the contents of the communication, collect information, and later use the information. Further, because of their size, wireless terminals are often lost or misplaced and retained by unauthorized users. An unauthorized user of the wireless terminal typically has use of the wireless terminal until the theft is discovered and the service for the wireless terminal is ceased. The wireless terminal may be used to access the owner's confidential information, including, for example bank account numbers, access codes, security codes, and other confidential information. A thief may be able to access the funds of the user simply by having possession of the wireless terminal. By intercepting transmissions and extracting this information therefrom, similar breaches may be performed. Thus, a need exists to prevent unauthorized access to the wireless terminal in the operations it supports.

SUMMARY OF THE INVENTION

A wireless terminal constructed according to the present invention overcomes these among other shortcomings of the prior devices by implementing location-based transaction authentication. The wireless terminal includes a wireless interface, a user interface, a Global Positioning System (GPS) receiver, and a processing unit that communicatively couples to the wireless interface, user interface, and the GPS receiver. The wireless terminal may be a cellular telephone, a Wireless Local Area Network (WLAN) terminal, a Wireless Personal Area Network (WPAN) terminal or another type of wireless terminal.

The processing unit may include any type of processing device and supporting memory. The processing unit is operable to receive a transaction request from a user via the user interface. The transaction request is initiated by the user to commence a particular transaction that is supported by the wireless terminal. Examples of this transaction are electronic funds transactions, file transfer transactions, remote device access transactions, and other types of transactions that are supported by wireless terminals.

After receipt of the transaction request from the user interface, the processing unit is operable to access a servicing network via the wireless interface. The wireless terminal may be a cellular telephone, a WLAN terminal, a WPAN terminal, or another type of wireless terminal and be supported by a corresponding wireless network. In some embodiments, the wireless terminal includes multiple wireless interfaces that allow the wireless terminal to access multiple types of wireless networks. The processing unit is then operable to send a transaction initiation request to the servicing network. In response to the transaction initiation request, the wireless terminal receives an authentication challenge from the servicing network. The authentication challenge requests location information from the wireless terminal.

The processing unit of the wireless terminal services this authentication challenge by determining its current location via access of the GPS receiver. The structure and operation of GPS receivers is generally known. The processing unit receives a location of the wireless terminal from the GPS receiver and prepares an authentication response based upon the received location. The processing unit then initiates transmission of the authentication response to the servicing network via the wireless interface. When the authentication response is accepted by the servicing network, the processing unit is able to service the transaction between the user and the servicing network. However, when the authentication response is rejected the processing unit notifies the user of such rejection via the user interface.

According to a further aspect of the present invention, the processing unit prepares the authentication response additionally based upon prior location information that is stored in the wireless terminal and that was determined during at least one prior transaction. Thus, for example, the transaction request may relate to a prior transaction serviced by the wireless terminal. When servicing the prior transaction, the wireless terminal and servicing network established a history that included prior transaction location information. This prior transaction location information was stored both at a remote device and also on the wireless terminal for further use and authentication. Thus, with this further aspect of the invention, this prior transaction location information is used to further authenticate the wireless terminal.

According to another aspect of the present invention, the processing unit is further operable to determine a relative position of the wireless terminal with respect to a reference location. This relative position of the wireless terminal is then returned to the servicing network for further authentication operations. In determining the relative position of the wireless terminal with respect to reference location, the processing unit may be operable to prepare a user query based upon the authentication challenge. This user query may ask the user to respond regarding the wireless terminal's location with respect to the reference location. Such user query would be presented via the user interface. In response, the processing unit would receive a response via the user interface and, based upon this response, determine a relative position of the wireless terminal with respect to a reference location. The processing unit would then return this relative location via the wireless interface to the servicing network. In one particular embodiment of this operation, the query may ask the user what his/her position is with respect to a fixed terminal that is currently being accessed using the wireless terminal.

To increase security, the authentication challenge may also include a user input validation requirement. The user input validation requirement may be based upon the location transmitted in the authentication response. The user input validation requirement may ask for a password, a voice sample, or an iris scan of the user. The user input validation requirement may be included in the secondary authentication challenge transmitted from the servicing network to the wireless terminal. Other features and advantages of the present invention will become apparent from the following detailed description of the invention made with reference to the accompanying drawings.

DETAILED DESCRIPTION OF THE DRAWINGS

Figure 1:
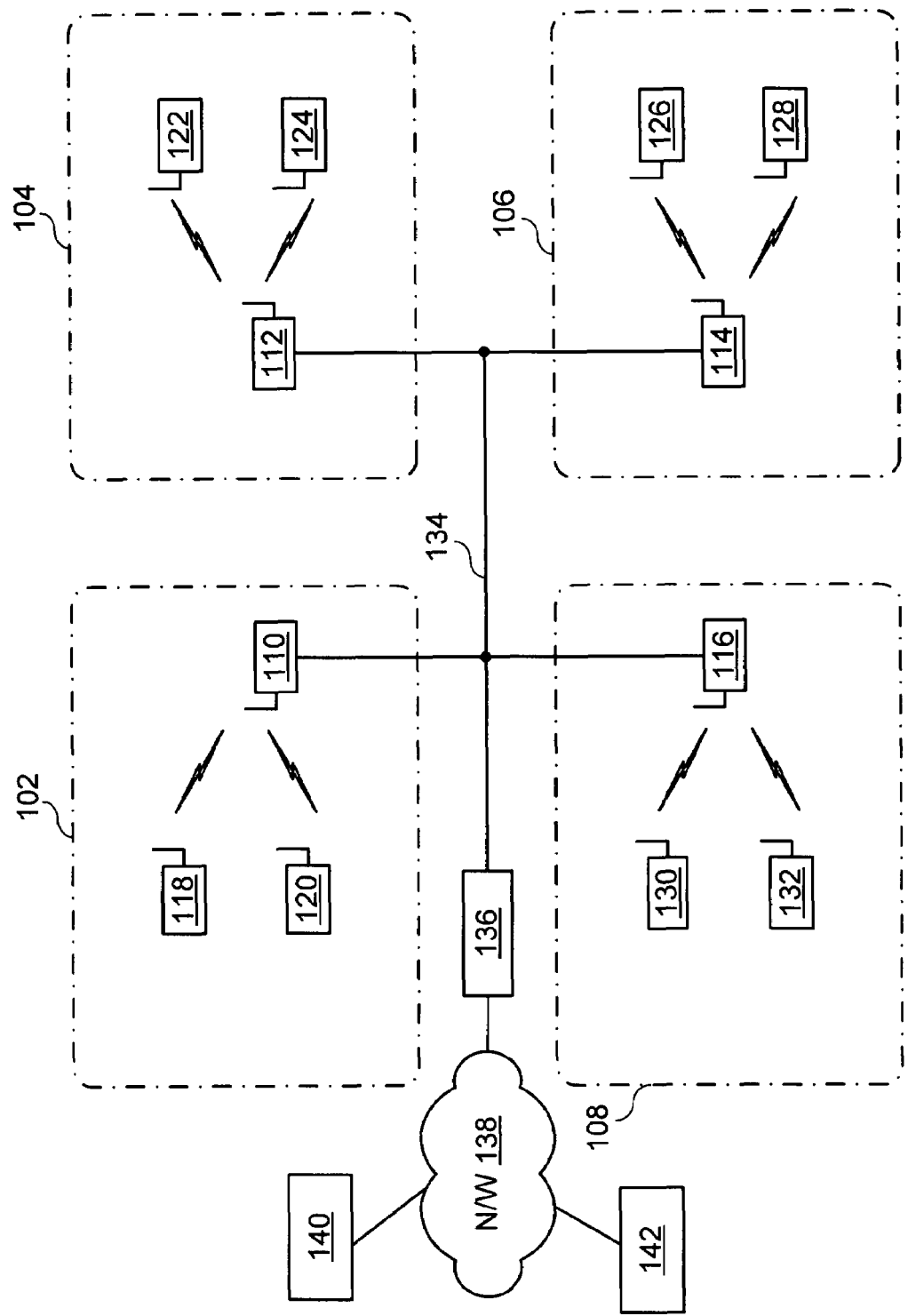
FIG. 1 is a system diagram illustrating a wireless communication system that services a wireless terminal operating according to the present invention.

FIG. 1 is a system diagram illustrating a wireless communication system that services a wireless terminal operating according to the present invention. The wireless communication system 100 of FIG. 1 shows diagrammatically location areas 102, 104, 106, and 108. Each of these location areas 102-108 may correspond to a traffic pattern of the wireless terminal. For example, location area 102 may correspond to an office building in which a user of the wireless terminal works. Likewise, location area 104 may correspond to the user's home. Further, location area 106 may correspond to one or more locations that the user frequents during working hours. Finally, location area 108 may correspond to an area or location that the user frequents during non-working times, e.g., a church, a local bar, restaurants, or other locations that the user frequents while not working. Each of the location areas 102-108 includes one or more servicing base stations or wireless access points (WAPs). For example, location area 102 includes base station/WAP 110. Likewise, location area 104 includes base station/WAP 112, location area 106 includes base station/WAP 114, and location area 108 includes base station/WAP 116. The reader should understand that the structure of FIG. 1 is used only to convey the principles of the present invention and it is not intended to be a detailed description of a cellular wireless communication system, a Wireless Local Area Network (WAN), or a Wireless Personal Area Network (WPAN).

As is shown, base station/WAP 110 supports wireless terminals 118 and 120 when in location area 102. Likewise, base station/WAP 112 supports wireless terminals 122 and 124 when in location area 104. Further, base station/WAP 114 supports wireless terminals 126 and 128 when in location area 106. Finally, base station/WAP 116 supports wireless terminals 130 and 132 when in location area 108. The base station/WAPs 110, 112, 114, and 116 are serviced via network backbone 134 and interface device 136. The interface device 136 couples the backbone network 134 to another network 138. The other network 138 may include a local area network, a wide area network, the Internet, or any other type of network that couples the network backbone 134 via the network interface 136 to computers or terminals 140 and 142.

Any of the wireless terminals 118-132 illustrated in FIG. 1 may operate according to the present invention. According to the present invention, a user of one of these wireless terminals 118-132 desires to initiate a transaction via the wireless terminal. In such case, the wireless terminal receives a transaction request from the user. According to the present invention, the location of the wireless terminal as determined via its Global Positioning System (GPS) receiver, as well as additional information, is employed to authenticate the transaction request. These operations are further described with reference to FIGS. 2-4. The structure of a wireless terminal that operates according to the present invention is described with reference to FIG. 5.

Figure 2:
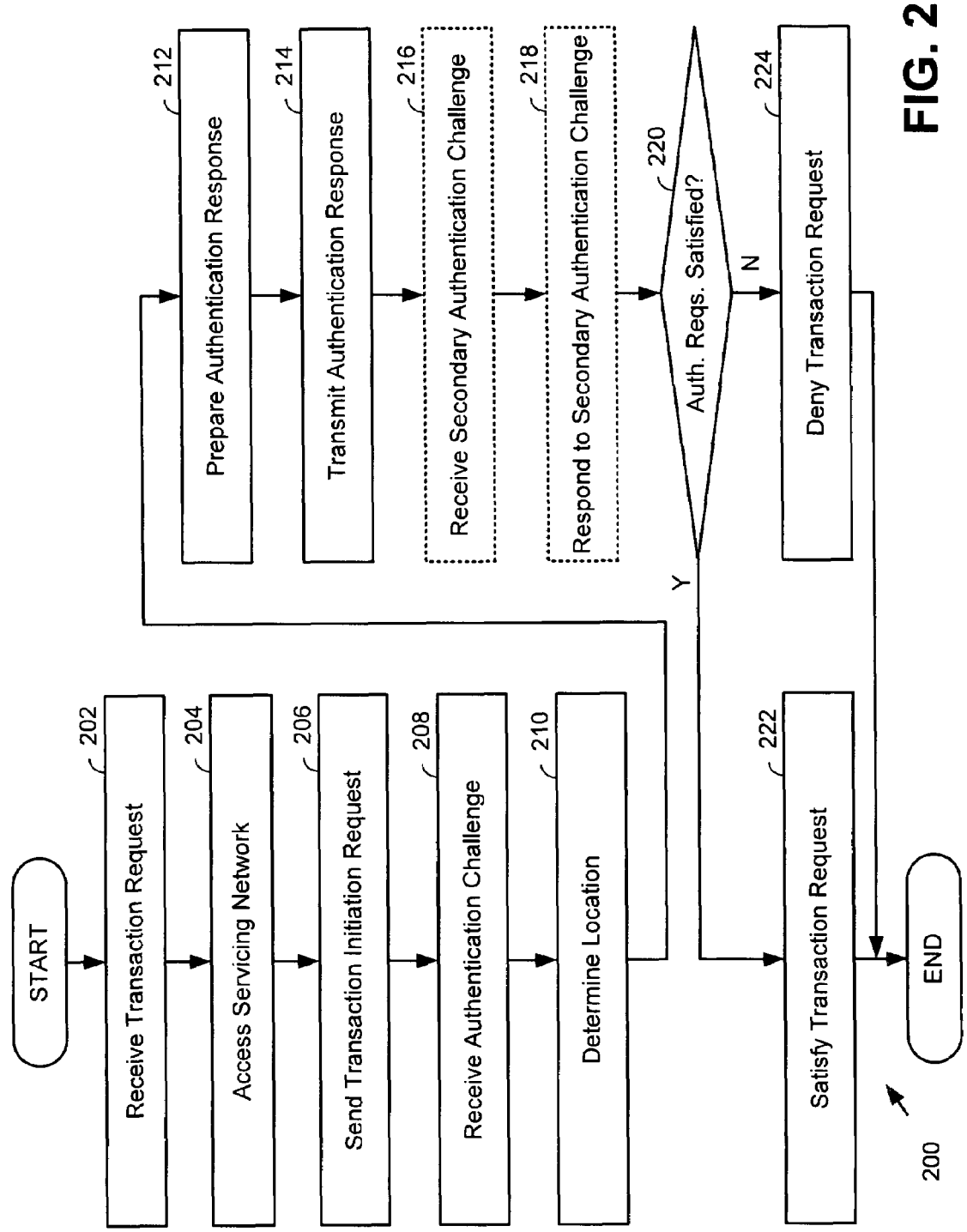
FIG. 2 is a flow chart illustrating operation according to a first embodiment of the present invention.

FIG. 2 is a flow chart illustrating operation according to the present invention. Operation commences in receiving a transaction request from the user (Step 202). In response to receipt of the transaction request from the user, the wireless terminal accesses a servicing network (Step 204). Then, the wireless terminal sends a transaction initiation request to the servicing network (Step 206). In response to the transaction initiation request, the wireless terminal receives an authentication challenge from the servicing network (Step 208). The authentication challenge requests location information from the wireless terminal. In response to the authentication challenge, the wireless terminal accesses its GPS receiver to determine its current location (Step 210).

The wireless terminal then prepares an authentication response based upon its current location (Step 212). The wireless terminal then transmits the authentication response to the servicing network (Step 214). At optional Step 216, the wireless terminal receives a secondary authentication challenge from the servicing network (Step 216). This authentication challenge includes a user input validation requirement. The user input validation requirement is based upon the location transmitted in the authentication response at Step 214. For example, the user input validation requirement is determined based upon which location area 102, 104, 106, or 108 the wireless terminal resides. The user input validation request may differ for each location 102-106 and for locations outside of these user group areas. The user input validation requirement may be particularly stringent when the wireless terminal is not located in any of these location areas. Such is the case because when the wireless terminal is located outside of these location areas, it is more likely that the wireless terminal has been stolen. The user input validation requirement may require at least one of the password, a voice sample, or an iris scan to be provided by the user.

The user input is then returned to the servicing network in response to the secondary authentication challenge (optional Step 218, required when Step 216 is performed). As the reader should appreciate, the user input validation requirement may also have been included in the authentication challenge of Step 218. In such case, the secondary user input validation requirement would be provided to the user, a response received, and the response prepared with the authentication response of Step 212.

Next, the wireless terminal and the servicing network determine whether the authentication requirements have been satisfied (Step 220). When the authentication response is satisfied, as determined at Step 220, the transaction request is satisfied (Step 222). In such case, the wireless terminal and servicing network service the transaction for the user to complete the transaction. However, if the authentication response is not satisfied, as determined at Step 220, the servicing network via the wireless terminal denies the user service of the transaction (Step 224). From both Steps 222 and 224 operation ends.

Figure 3:
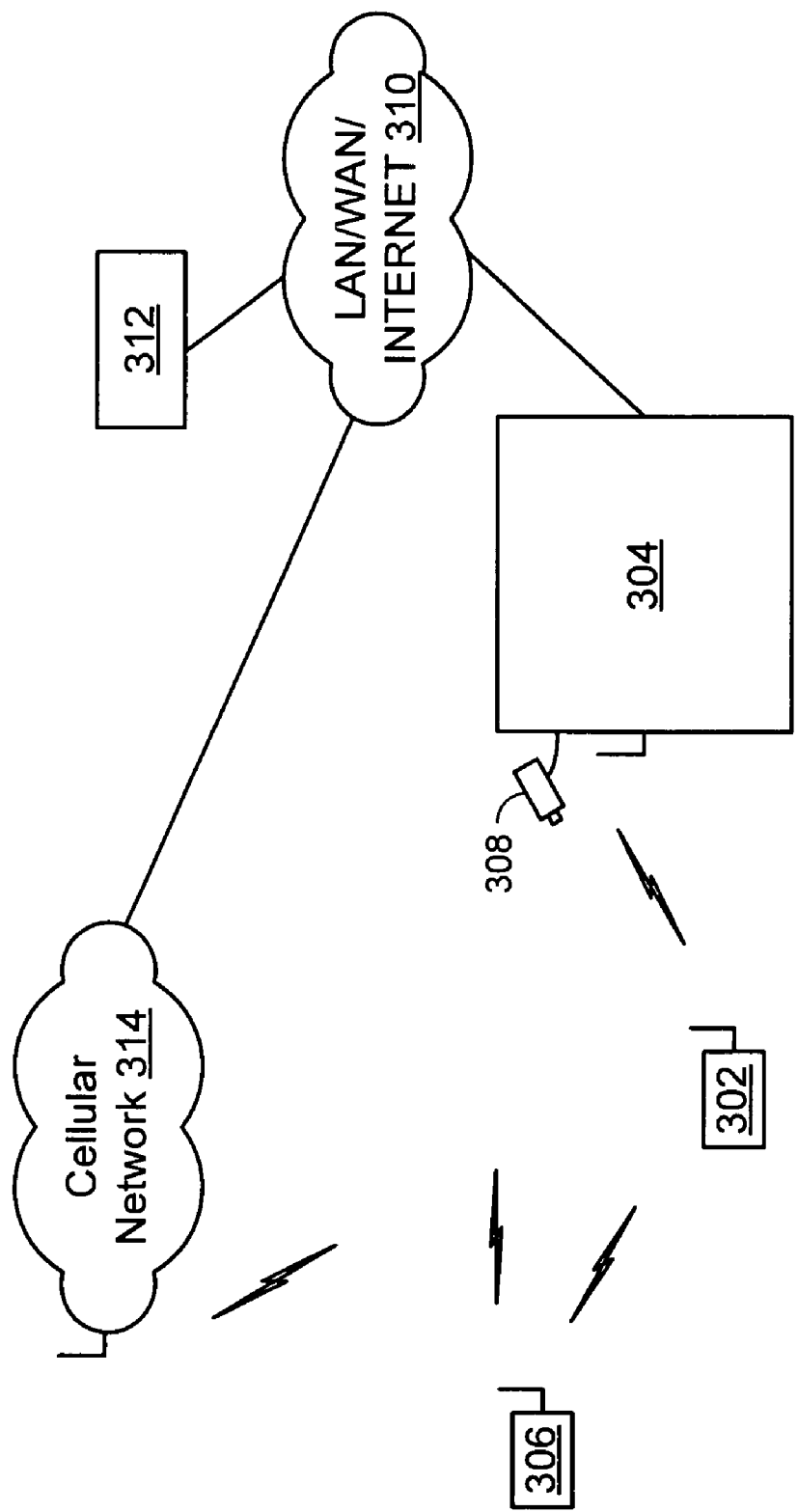
FIG. 3 is a block diagram illustrating the manner in which relative position location of the wireless terminal may be further used to authenticate the user of the wireless terminal.

FIG. 3 is a block diagram illustrating the manner in which relative position location of the wireless terminal may be further used to authenticate the user of the wireless terminal. As shown in FIG. 3, a fixed terminal 304 includes a camera 308 and a wireless interface capable of servicing a transaction with wireless terminal 302. The fixed terminal 304 couples to a server computer 312 via a network that may include a LAN, a WAN, and/or the Internet 310. A user of wireless terminal 302 accesses the fixed terminal 304 via a wireless link to initiate a transaction with the server computer 312. In one particular example of the structure of FIG. 3, the fixed terminal 304 is an Automated Teller Machine (ATM) that will provide cash to the user of the wireless terminal 302 upon completion of the transaction. Both wireless terminal 302 and fixed terminal 304 support wireless communications via a WLAN or WPAN interface standard. In an alternate embodiment, the wireless terminal 302 initiates the transaction via a wireless cellular network 314.

With the embodiment of FIG. 3, a user of wireless terminal 306 may intercept the sensitive transaction information wirelessly passed between wireless terminal 302 and fixed terminal 304. The transaction information passed between wireless terminal 302 and fixed terminal 304 may be sufficient for the user of wireless terminal 306 that is eaves-dropping on these communications to later initiate a fraudulent transaction. Alternatively, by listening to the ongoing communications, the user of wireless terminal 306 may be able to alter the ongoing transaction to divert funds to his/her own bank account.

Thus, according to another aspect to the present invention, the relative position of the wireless terminal 302 is determined with respect to a reference location, e.g., the fixed terminal 304 is employed to further authenticate the transaction. The relative position of the wireless terminal is determined and then returned to the servicing network via terminal 304 for additional authentication processing of the authentication response. In accomplishing this result, as will be further described with reference to FIG. 4, the relative position of wireless terminal 302 may be determined with respect to fixed terminal 304 using camera 308. With other embodiments, a user query may be prepared. These operations are described further with reference to FIG. 4.

Figure 4:
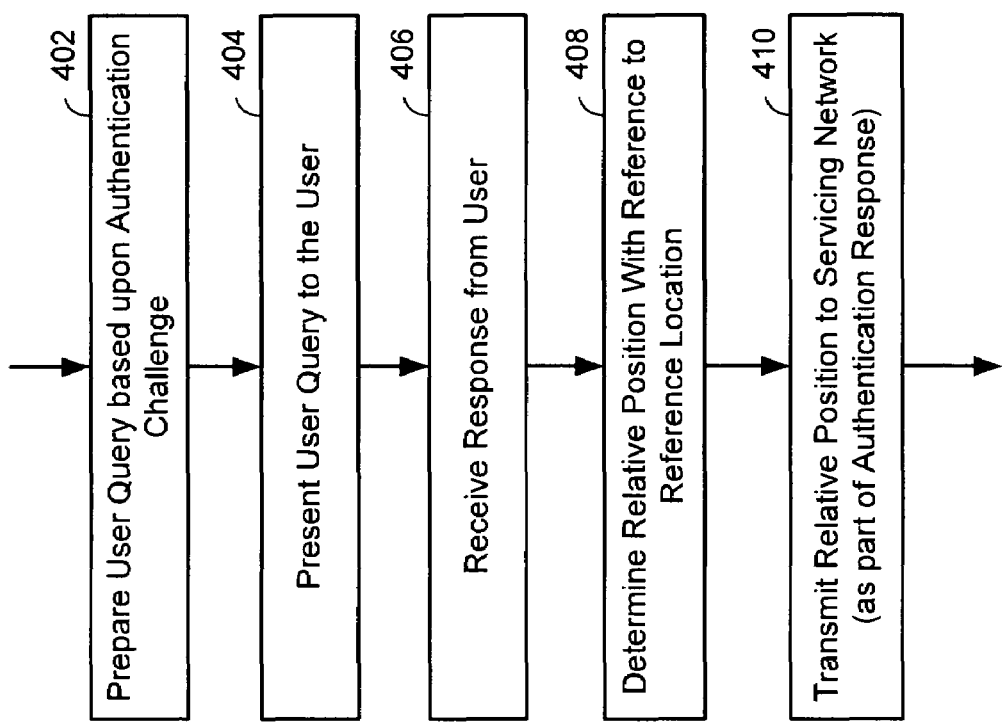
FIG. 4 is a flow chart illustrating operation according to the present invention in providing enhanced location based authentication operations.

FIG. 4 is a flow chart illustrating operation according to the present invention in providing enhanced location based authentication operations. The operations of FIG. 4 should be viewed in conjunction with the diagram of FIG. 3. As a first operation, the servicing network prepares the user query based upon the authentication challenge (Step 402). This user query may be based upon the perceived relative location of wireless terminal 302 with respect to fixed terminal 304, for example using camera 308. However, this user query may also be based upon the reported location of wireless terminal and an expected relative position of the wireless terminal with respect to a landmark, a street corner, a skyscraper, or another reference location. The user query is then presented to the user (Step 404). The user query may be structured in the form of a multiple choice question, an estimated distance to the reference point, or another form that requires the user to provide the relative position information. The wireless terminal receives the response from the user (Step 406). The user terminal then determines the relative position with reference to the reference location (Step 408). This may be directly perceived from the response from the user at Step 406 or it may have to be calculated by the wireless terminal. The wireless terminal then transmits the relative position to the servicing network (Step 410). This relative position may be transmitted in the authentication response at Step 212, in response to the secondary authentication challenge Step 218, or at another point of operation. The relative position information transmitted at Step 410 to the servicing network is further used to authenticate the user of the wireless terminal.

Figure 5:
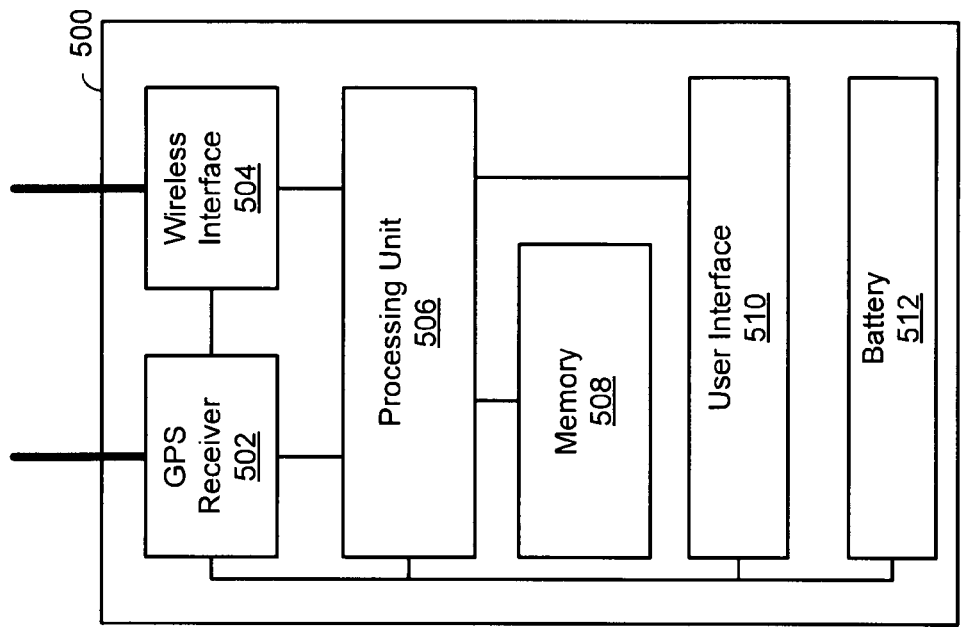
FIG. 5 is a block diagram illustrating a wireless terminal constructed and operating according to the present invention.

FIG. 5 is a block diagram illustrating a wireless terminal constructed and operating according to the present invention. As shown in FIG. 5, the wireless terminal 500 includes a GPS receiver 502, a wireless interface 504, processing unit 506, memory 508, user interface 510, and a battery 512. The components of the wireless terminal are typically contained within a hard case that provides protection from the elements. The structure of the GPS receiver 502 is known. The wireless interface 502 will have particular structure and functionality based upon the type of the wireless terminal 500. For example, when the wireless terminal is a cellular telephone, the wireless interface 504 will support a corresponding interface standard, e.g., GSM, CDMA, TDMA, FDMA, etc. The wireless interface 504 of the cellular telephone 504 may also/alternately support WLAN and/or WPAN functionality. When the wireless terminal is a WLAN terminal for example, the wireless interface 504 will support standardized communication according to the IEEE 802.11x group of standards, for example. When the wireless terminal is a WPAN device, the wireless interface 504 would support the Bluetooth interface standard or another WPAN standard such as the 802.15 standard. In any case, the wireless interface 504 may support all or a subset of cellular telephone, WLAN, and WPAN operations.

The processing unit 506 may include any type of processor such as a microprocessor, a digital signal processor, an application specific Integrated Circuit (ASIC), or a combination of processing type devices. The processing unit 506 is operable to execute a plurality of software instructions that are stored in memory 508 and downloaded for execution. The processing unit 506 may also include specialized hardware required to implement particular aspects of the present invention.

Memory 508 may include SRAM, DRAM, PROM, flash RAM, or any other type of memory capable of storing data and instructions.

A user interface 510 may include a keypad, a screen, a touch screen, a voice recognition system, an optical recognition system that would authenticate a user's iris, for example, and/or any other type of interface that may be employed in the wireless terminal. In some embodiments, the user interface 510 may include therewith ability to service a headset including microphone and earpiece for the user. Battery 512 powers the components of the wireless terminal 500.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for operating a wireless terminal to service a transaction, the method comprising:
   receiving a transaction request from a user;
   accessing a fixed terminal via a Wireless Personal Area Network (WPAN);
   sending a transaction initiation request to the fixed terminal via the WPAN;
   receiving an authentication challenge from the fixed terminal via the WPAN, the authentication challenge requesting location information from the wireless terminal;
   accessing a Global Positioning System (GPS) receiver of the wireless terminal to determine a current location of the wireless terminal;
   preparing an authentication response based upon both the current location of the wireless terminal and prior location information that is stored on the wireless terminal that was determined during at least one prior transaction;
   transmitting the authentication response to the fixed terminal via the WPAN;
   when the authentication response is accepted, servicing the transaction between the user and the fixed terminal via the WPAN; and
   when the authentication request is rejected, notifying the user.

2. The method of claim 1, wherein the prior location information that is stored on the wireless terminal that was determined during at least one prior transaction includes information relating to a transaction that occurred at a differing location of the wireless terminal.

3. The method of claim 1, wherein the authentication challenge further includes a user input validation requirement that is based upon at least one of the current location and the prior location information, and the method further comprises:
   querying the user based upon the authentication challenge;
   receiving a user location response; and
   preparing the authentication response based upon the user location response.

4. The method of claim 1, wherein the authentication challenge farther includes a user input validation requirement requiring at least one of a voice sample and an iris scan from the user, and the method further comprises:
   receiving a user input validation response from the user responsive to the user input validation requirement; and
   preparing the authentication response based upon the user input validation response.

5. The method of claim 1, wherein the authentication challenge further includes a password request and the method further comprises:
   querying the user for a password;
   receiving a password from the user; and
   including the password with the authentication response.

6. A method for operating a wireless terminal to service a transaction comprising:
   receiving a transaction request from a user;
   accessing a fixed terminal via a Wireless Personal Area Network (WPAN);
   sending a transaction initiation request to the fixed terminal via the WPAN;
   receiving an authentication challenge from the fixed terminal via the WPAN, the authentication challenge requesting location information from the wireless terminal;
   accessing a Global Positioning System (GPS) receiver of the wireless terminal to determine a current location of the wireless terminal;
   determining a relative position of the wireless terminal with respect to a reference location;
   preparing an authentication response based upon both the current location of the wireless terminal and the relative position of the wireless terminal with respect to the reference location;
   transmitting the authentication response to the fixed terminal via the WPAN;
   when the authentication response is accepted, servicing the transaction between the user and the fixed terminal via the WPAN; and
   when the authentication request is rejected, notifying the user.

7. The method of claim 6, wherein the reference location corresponds to the fixed terminal.

8. The method of claim 6, wherein determining a relative position of the wireless terminal with respect to a reference location comprises:
   preparing a wireless terminal location query based upon the current location and a location of the fixed terminal;
   presenting the wireless terminal location query to the user;

receiving a wireless terminal location response from the user; and preparing the authentication response based upon the wireless terminal location response.

9. The method of claim 6, wherein the authentication challenge further includes a user input validation requirement that is based upon at least one of the current location and the prior location information, and the method further comprises:

querying the user based upon the authentication challenge;
receiving a user location response; and
preparing the authentication response based upon the user location response.

10. The method of claim 6, wherein the authentication challenge farther includes a user input validation requirement requiring at least one of a voice sample and an iris scan from the user, and the method further comprises:

receiving a user input validation response from the user responsive to the user input validation requirement; and
preparing the authentication response based upon the user input validation response.

11. The method of claim 6, wherein the authentication challenge farther includes a password request and the method farther comprises:

querying the user for a password;
receiving a password from the user; and
including the password with the authentication response.

12. A method for operating a wireless terminal to service a transaction, the method comprising:

receiving a transaction request from a user;
accessing a fixed terminal via a Wireless Personal Area Network (WPAN);
sending a transaction initiation request to the fixed terminal via the WPAN;
receiving an authentication challenge from the fixed terminal via the WPAN, the authentication challenge requesting location information from the wireless terminal;
accessing a Global Positioning System (GPS) receiver of the wireless terminal to determine a current location of the wireless terminal;
determining a relative position of the wireless terminal with respect to a reference location by:
 preparing a user query based upon the authentication challenge;
 presenting the user query to the user;
 receiving a response from the user; and
 determining the relative position of the wireless terminal with respect to the reference location based upon the response from the user;
preparing an authentication response based upon both the current location of the wireless terminal and the relative position of the wireless terminal with respect to the reference location;
transmitting the authentication response to the fixed terminal via the WPAN;
when the authentication response is accepted, servicing the transaction between the user and the fixed terminal via the WPAN; and
when the authentication request is rejected, notifying the user.

13. The method of claim 12, wherein the reference location corresponds to the fixed terminal.

14. The method of claim 12, wherein the authentication challenge further includes a user input validation requirement that is based upon at least one of the current location and the prior location information, and the method further comprises:

querying the user based upon the authentication challenge;
receiving a user location response; and
preparing the authentication response based upon the user location response.

15. The method of claim 12, wherein the authentication challenge further includes a user input validation requirement requiring at least one of a voice sample and an iris scan from the user, and the method further comprises:

receiving a user input validation response from the user responsive to the user input validation requirement; and
preparing the authentication response based upon the user input validation response.

16. The method of claim 12, wherein the authentication challenge further includes a password request and the method further comprises:

querying the user for a password;
receiving a password from the user; and
including the password with the authentication response.

17. A method for operating a wireless terminal to service a transaction, the method comprising:

receiving a transaction request from a user;
accessing a fixed terminal via a Wireless Personal Area Network (WPAN) interface of the wireless terminal;
sending a transaction initiation request to the fixed terminal via the WPAN interface;
receiving an authentication challenge from the fixed terminal via the WPAN interface, the authentication challenge requesting a relative position of the wireless terminal with respect to the fixed terminal;
determining its relative position with respect to the fixed terminal using the WPAN interface;
preparing an authentication response based upon its relative position with respect to the fixed terminal;
transmitting the authentication response to the fixed terminal via the WPAN interface;
when the authentication response is accepted, servicing the transaction between the user and the fixed terminal via the WPAN interface; and
when the authentication request is rejected, notifying the user.

18. The method of claim 17, wherein the authentication challenge further includes a user input validation requirement that is based upon at least one of the current location and the prior location information, and the method further comprises:

querying the user based upon the authentication challenge;
receiving a user location response; and
preparing the authentication response based upon the user location response.

19. The method of claim 17, wherein the authentication challenge further includes a user input validation requirement requiring at least one of a voice sample and an iris scan from the user, and the method further comprises:

receiving a user input validation response from the user responsive to the user input validation requirement; and
preparing the authentication response based upon the user input validation response.

20. The method of claim 17, wherein the authentication challenge further includes a password request and the method further comprises:

querying the user for a password;
receiving a password from the user; and
including the password with the authentication response.

21. A wireless terminal comprising:
a Wireless Personal Area Network (WPAN) interface;
a user interface;
a Global Positioning System (GPS) receiver; and a processing unit coupled to the WPAN interface interface, to the user interface, and to the GPS receiver, the processing unit operable to:
  receive a transaction request from a user via the user interface;
  access a fixed terminal using the WPAN interface;
  send a transaction initiation request to the fixed terminal via the WPAN interface;
  receive an authentication challenge from the fixed terminal via the WPAN interface, the authentication challenge requesting location information from the wireless terminal;
  access the GPS receiver of the wireless terminal to determine a current location of the wireless terminal;
  prepare an authentication response based upon both the current location of the wireless terminal and prior location information that is stored on the wireless terminal that was determined during at least one prior transaction;
  transmit the authentication response to the fixed terminal via the WPAN interface;
  when the authentication response is accepted, service the transaction between the user and the fixed terminal via the WPAN interface; and
  when the authentication request is rejected, notify the user via the user interface.

22. The wireless terminal of claim 21, wherein the prior location information that was determined during at least one prior transaction includes information relating to a transaction that occurred at a differing location of the wireless terminal.

23. The wireless terminal of claim 21, wherein the authentication challenge further includes a user input validation requirement that is based upon at least one of the current location and the prior location information, and the processing circuitry is further operable to:
  query the user based upon the authentication challenge via the user interface;
  receive a user location response via the user interface; and
  prepare the authentication response based upon the user location response.

24. The wireless terminal of claim 21, wherein the authentication challenge further includes a user input validation requirement requiring at least one of a voice sample and an iris scan from the user, and the processing circuitry is further operable to:
  receive a user input validation response from the user via the user interface that is responsive to the user input validation requirement; and
  prepare the authentication response based upon the user input validation response.

25. The wireless terminal of claim 21, wherein the authentication challenge further includes a password request and the processing circuitry is further operable to:
  query the user for a password via the user interface;
  receive a password from the user via the user interface; and
  include the password with the authentication response.

26. A wireless terminal comprising:
  a Wireless Personal Area Network (WPAN) interface;
  a user interface;
  a Global Positioning System (GPS) receiver; and
  a processing unit coupled to the WPAN interface, to the user interface, and to the GPS receiver, the processing unit operable to:
    receive a transaction request from a user via the user interface;
    access a fixed terminal via the WPAN interface;
    send a transaction initiation request to the fixed terminal via the WPAN interface;
    receive an authentication challenge from the fixed terminal via the WPAN interface, the authentication challenge requesting location information from the wireless terminal;
    access the GPS receiver to determine a current location of the wireless terminal;
    determine a relative position of the wireless terminal with respect to a reference location;
    prepare an authentication response based upon both the current location of the wireless terminal and the relative position of the wireless terminal with respect to the reference location;
    transmit the authentication response to the fixed terminal via the WPAN interface;
    when the authentication response is accepted, service the transaction between the user and the fixed terminal via the WPAN interface; and
    when the authentication request is rejected, notify the user via the user interface.

27. The wireless terminal of claim 26, wherein the reference location corresponds to the fixed terminal.

28. The wireless terminal of claim 26, wherein in determining a relative position of the wireless terminal with respect to a reference location, the processing circuitry is further operable to:
  prepare a wireless terminal location query based upon the current location and a location of the fixed terminal;
  present the wireless terminal location query to the user via the user interface;
  receive a wireless terminal location response from the user via the user interface; and
  prepare the authentication response based upon the wireless terminal location response.

29. The wireless terminal of claim 26, wherein the authentication challenge further includes a user input validation requirement that is based upon at least one of the current location and the prior location information, and the processing circuitry is further operable to:
  query the user based upon the authentication challenge via the user interface;
  receive a user location response via the user interface; and
  prepare the authentication response based upon the user location response.

30. The wireless terminal of claim 26, wherein the authentication challenge further includes a user input validation requirement requiring at least one of a voice sample and an iris scan from the user, and the processing circuitry is further operable to:
  receive a user input validation response from the user via the user interface that is responsive to the user input validation requirement; and
  prepare the authentication response based upon the user input validation response.

31. The wireless terminal of claim 26, wherein the authentication challenge further includes a password request and the processing circuitry is further operable to:
  query the user for a password via the user interface;
  receive a password from the user via the user interface; and
  include the password with the authentication response.

32. A wireless terminal comprising:
  a Wireless Personal Area Network (WPAN) interface;
  a user interface;
  a Global Positioning System (GPS) receiver; and a processing unit coupled to the WPAN interface, to the user interface, and to the GPS receiver, the processing unit operable to:
  receive a transaction request from a user;
  access a fixed terminal via the WPAN interface;
  send a transaction initiation request to the fixed terminal via the WPAN interface;
  receive an authentication challenge from the fixed terminal via the WPAN interface, the authentication challenge requesting location information from the wireless terminal;
  accessing the GPS receiver of the wireless terminal to determine a current location of the wireless terminal;
  determine a relative position of the wireless terminal with respect to a reference location by:
    preparing a user query based upon the authentication challenge;
    presenting the user query to the user via the user interface;
    receiving a response from the user via the user interface; and
    determining the relative position of the wireless terminal with respect to the reference location based upon the response from the user;
  prepare an authentication response based upon both the current location of the wireless terminal and the relative position of the wireless terminal with respect to the reference location;
  transmit the authentication response to the fixed terminal via the WPAN interface;
  when the authentication response is accepted, service the transaction between the user and the fixed terminal via the WPAN interface; and
  when the authentication request is rejected, notifying the user via the user interface.

33. The wireless terminal of claim 32, wherein the reference location corresponds to the fixed terminal.

34. The wireless terminal of claim 32, wherein the authentication challenge further includes a user input validation requirement that is based upon at least one of the current location and the prior location information, and the processing circuitry is further operable to:
  query the user based upon the authentication challenge via the user interface;
  receive a user location response via the user interface; and
  prepare the authentication response based upon the user location response.

35. The wireless terminal of claim 32, wherein the authentication challenge further includes a user input validation requirement requiring at least one of a voice sample and an iris scan from the user, and the processing circuitry is further operable to:
  receive a user input validation response from the user via the user interface that is responsive to the user input validation requirement; and
  prepare the authentication response based upon the user input validation response.

36. The wireless terminal of claim 32, wherein the authentication challenge further includes a password request and the processing circuitry is further operable to:
  query the user for a password via the user interface;
  receive a password from the user via the user interface; and
  include the password with the authentication response.

37. A wireless terminal comprising:
  a Wireless Personal Area Network (WPAN) interface;
  a user interface;
  a Global Positioning System (GPS) receiver; and
  a processing unit coupled to the WPAN interface, to the user interface, and to the GPS receiver, the processing unit operable to:
    receive a transaction request from a user via the user interface;
    access a fixed terminal via the WPAN interface of the wireless terminal;
    sending a transaction initiation request to the fixed terminal via the WPAN interface;
    receive an authentication challenge from the fixed terminal via the WPAN interface, the authentication challenge requesting a relative position of the wireless terminal with respect to the fixed terminal;
    determine a relative position of the wireless terminal with respect to the fixed terminal using the WPAN interface;
    preparing an authentication response based upon its relative position with respect to the fixed terminal;
    transmitting the authentication response to the fixed terminal via the WPAN interface;
    when the authentication response is accepted, servicing the transaction between the user and the fixed terminal via the WPAN interface; and
    when the authentication request is rejected, notifying the user.

38. The wireless terminal of claim 37, wherein the authentication challenge further includes a user input validation requirement that is based upon at least one of the current location and the prior location information, and the processing circuitry is further operable to:
  query the user based upon the authentication challenge via the user interface;
  receive a user location response via the user interface; and
  prepare the authentication response based upon the user location response.

39. The wireless terminal of claim 37, wherein the authentication challenge further includes a user input validation requirement requiring at least one of a voice sample and an iris scan from the user, and the processing circuitry is further operable to:
  receive a user input validation response from the user via the user interface that is responsive to the user input validation requirement; and
  prepare the authentication response based upon the user input validation response.

40. The wireless terminal of claim 37, wherein the authentication challenge further includes a password request and the processing circuitry is further operable to:
  query the user for a password via the user interface;
  receive a password from the user via the user interface; and
  include the password with the authentication response.

* * * * *

UNITED STATES PATENT AND TRADEMARK OFFICE
CERTIFICATE OF CORRECTION

PATENT NO. : 7,418,267 B2  Page 1 of 1
APPLICATION NO. : 11/731237
DATED : August 26, 2008
INVENTOR(S) : Jeyhan Karagouz It is certified that error appears in the above-identified patent and that said Letters Patent is hereby corrected as shown below:

Column 8, line 20, in Claim 4: replace "farther" with --further--.

Column 9, line 14, in Claim 10: replace "farther" with --further--.

Column 9, line 22, in Claim 11: replace "farther" with --further--.

Column 9, line 23, in Claim 11: replace "farther" with --further--.

Column 11, line 1, in Claim 21: replace "WPAN interface interface," with --WPAN interface,--.

Signed and Sealed this

Seventh Day of April, 2009

JOHN DOLL
*Acting Director of the United States Patent and Trademark Office*